(12) United States Patent
Okamoto (10) Patent No.: US 7,600,418 B2
(45) Date of Patent: Oct. 13, 2009

(54) SENSOR ADJUSTING METHOD AND SYSTEM FOR VARIABLE VALVE MECHANISM

(75) Inventor: Naoki Okamoto, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 12/029,898

(22) Filed: Feb. 12, 2008

(65) Prior Publication Data

US 2008/0196486 A1    Aug. 21, 2008

(30) Foreign Application Priority Data

Feb. 14, 2007   (JP) ............... 2007-033720

(51) Int. Cl.
*G01M 15/04*   (2006.01)
(52) U.S. Cl. .................................. 73/114.79
(58) Field of Classification Search .......... 73/114.77, 73/114.79, 115.01; 701/29, 31, 34
See application file for complete search history.

(56) References Cited

U.S. PATENT DOCUMENTS

| 7,047,924 | B1 * | 5/2006 | Waters et al. | ............ 123/90.16 |
| 7,146,851 | B2 * | 12/2006 | Wakahara et al. | ........ 73/114.72 |
| 7,191,055 | B2 * | 3/2007 | Miyakoshi | ................... 701/114 |
| 7,308,873 | B2 | 12/2007 | Arai et al. | |
| 7,444,236 | B2 * | 10/2008 | Wiles | .......................... 701/114 |
| 2007/0101959 | A1 * | 5/2007 | Soejima | ................... 123/90.17 |

FOREIGN PATENT DOCUMENTS

| JP | 2003-194580 A | 7/2003 |
| JP | 2005-299578 A | 10/2005 |

* cited by examiner

*Primary Examiner*—Eric S McCall
(74) *Attorney, Agent, or Firm*—Foley & Lardner LLP (57) ABSTRACT

The present application provides a sensor adjusting method and a sensor adjusting system for a variable valve mechanism. An actuator is controlled based on an adjustment request signal from an external device in such a manner that a mechanical load of a variable valve mechanism moves to a position where the movement is limited by a stopper. When it is judged that the mechanical load has moved to the position where the movement is limited by the stopper, the mounting position and the electrical characteristics of the sensor for detecting the mechanical load are adjusted so that the output of the sensor assumes a reference value.

20 Claims, 7 Drawing Sheets

SENSOR ADJUSTING METHOD AND SYSTEM FOR VARIABLE VALVE MECHANISM

BACKGROUND OF THE INVENTION

1. Field of the Invention

The present invention relates to an adjusting method and an adjusting system for a sensor, which is used for detecting a position of an actuator-driven mechanical load arranged in a variable valve mechanism for variably changing open characteristics of an engine valve, in accordance with the position of the mechanical load.

2. Description of the Related Art

Japanese Laid-pen (Kokai) Patent Application Publication No. 2005-299578 discloses a variable valve mechanism in which lift amount of an intake valve of an internal combustion engine is continuously changed in accordance with the rotation position of a control shaft of the variable valve mechanism, which shaft behaves as a mechanical load.

Further, the above-mentioned publication discloses the technique that an output characteristic of a sensor for detecting a rotation position of the control shaft is learned based on an output of the sensor in a state where the control shaft is actuated to rotate so as to minimize the lift amount of the engine valve.

In the case where a mounting position of the sensor is in misalignment with a regular position at the time of replacement of the sensor, the output of the sensor is liable to exceed a tolerable input range of a processing circuit.

Once the sensor output exceeds the tolerable input range of the processing circuit, the rotation position of the control shaft cannot be correctly detected from the sensor output even in the case where the sensor output is learned at the time of the minimum lift amount of the engine valve as described above.

As long as the sensor output is higher than the tolerable input range of the processing circuit, therefore, it is unavoidably necessary to make adjustment of the mounting position of the sensor.

Nevertheless, the variable valve mechanism disclosed in the aforementioned publication is not equipped with any means such as a return spring or the like for achieving automatic restoration of the control shaft to a specified position, and therefore, the rotational position of the control shaft may become uncertain when the engine is stopped and the actuator is stopped to drive the control shaft.

The variable valve mechanism described above, therefore, must pose such a problem that it is difficult to accurately adjust the mounting position of the sensor for detecting the rotation position of the control shaft.

SUMMARY OF THE INVENTION

Accordingly, it is an object of the present invention to accurately adjust an output of a sensor based on the output of the sensor with the mechanical load at a predetermined position even in a variable valve mechanism, which is equipped with none of the means for automatically restoring the mechanical load to a specified position.

In order to achieve the above-described object, according to this invention, the mechanical load is moved to a reference position by an actuator, followed by judgment whether the mechanical load has moved to the reference position or not, and after the mechanical load is moved to the reference position, it is judged whether the sensor output is within a reference range and, if not, the sensor output is adjusted into the reference range.

The other objects and features of this invention will become understood from the following description with reference to the accompanying drawings.

DESCRIPTION OF THE PREFERRED EMBODIMENTS

Figure 1:
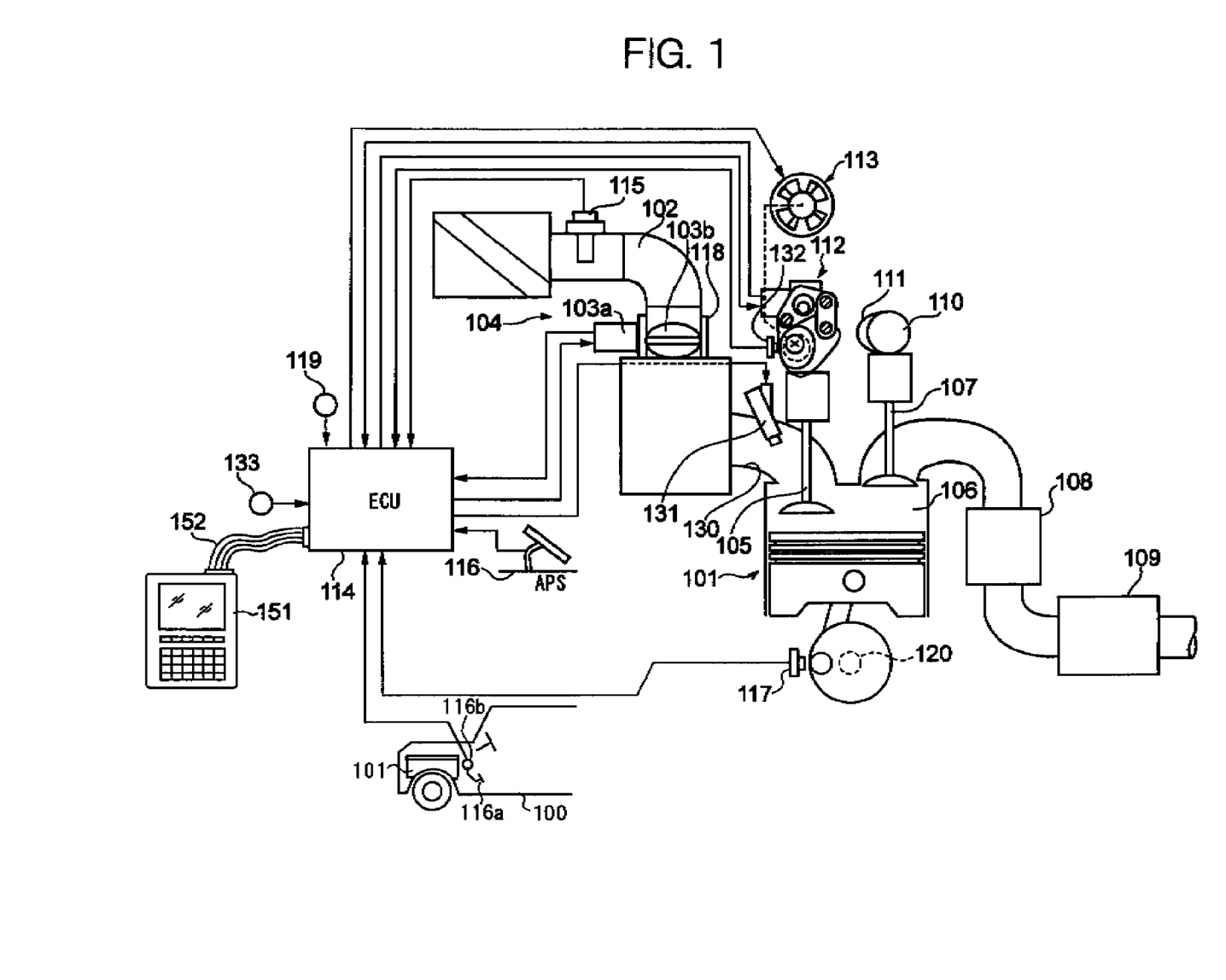
FIG. 1 is a diagrammatic view illustrating a vehicle engine according to an embodiment of the present invention.

FIG. 1 is a system diagram of an engine 101 mounted on a vehicle 100.

Referring to FIG. 1, engine (internal combustion engine) 101 has intake pipe 102 in which electronically controlled throttle 104 is disposed, which includes throttle motor 103a and throttle valve 103b.

Air is introduced into combustion chamber 106 of engine 101 through electronically controlled throttle 104 and intake valves 105.

Also, on an intake port 130 which is situated on an upstream side of intake valves 105 of each cylinder, a fuel injection valve 131 is disposed.

Fuel injection valve 131 injects fuel in an amount proportional to an injection pulse width of an injection pulse signal sent from a control unit 114.

The fuel introduced into combustion chamber 106 is ignited and combusted by a spark from a spark plug (not shown in the figure).

The combustion exhaust gas in combustion chamber 106 is emitted through an exhaust valve 107, and after being purified by a front catalytic converter 108 and a rear catalytic converter 109, and released into the atmosphere.

Exhaust valve 107 is opened/closed while maintaining a predetermined valve lift amounts a valve operation angle and a valve timing by means of a cam 111 arranged on an exhaust camshaft 110.

Intake valve 105, on the other hand, has the open characteristics (valve lift amount, valve operation angle and valve timing) thereof which are variably changed by a variable lift mechanism 112 and a variable valve timing mechanism 113.

Variable lift mechanism 112 is a mechanism for continuously changing the valve lift amount and the valve operation angle of intake valves 105.

Also, variable valve timing mechanism 113 is a mechanism for continuously changing the center phase of the valve operation angle of intake valves 105 by changing the rotation phase of an intake camshaft 3 with respect to a crankshaft 120

For variable valve timing mechanism 113, a hydraulic mechanism using a vane may be used, for example.

In the hydraulic variable valve timing mechanism having the vane described above, the vane supported on intake camshaft 3 is included in a casing supported on a cam sprocket, to thereby form an advanced hydraulic chamber and a retarded hydraulic chamber on both sides of the vane. By supplying and releasing the oil pressure into and from the advanced hydraulic chamber and the retarded hydraulic chamber, the angle of the vane relative to the cam sprocket is changed, thereby changing the rotation phase of intake camshaft 3 with respect to crankshaft 120.

Control unit 114 having a microcomputer incorporated therein sets a fuel injection rate, an ignition timing, a target intake air amount and a target intake negative pressure by the arithmetic operation in accordance with a program stored in advancer and based on these data, outputs a control signal to fuel injection valve 131, a power transistor for the ignition coil, electronically controlled throttle 104, variable lift mechanism 112 and variable valve timing mechanism 113.

Variable lift mechanism 112 and variable valve timing mechanism 113 can be controlled alternatively by a control unit which is separated from control unit 114.

Electronically controlled throttle 104 is primarily intended to generate an intake negative pressure, and the intake air amount of engine 101 is controlled by changing the open characteristic of intake valves 105 by variable lift mechanism 112 and variable valve timing mechanism 113.

Control unit 114 receives signals from various sensors.

The various sensors include an air flow sensor 115 for detecting the amount of air introduced into engine 101, an acceleration sensor 116b for detecting the angle of an accelerator pedal 116a of vehicle 100, a crank angle sensor 117 for outputting a crank angle signal for each reference rotation position of crankshaft 120, a throttle sensor 118 for detecting an opening degree TVO of throttle valve 103b, a water temperature sensor 119 for detecting the temperature of cooling water of engine 101, a cam sensor 132 for outputting a cam signal for each reference rotation position of intake camshaft 3, and an angle sensor 133 for detecting the rotation position of control shaft 13 (mechanical load) of variable lift mechanism 112.

Figure 2:
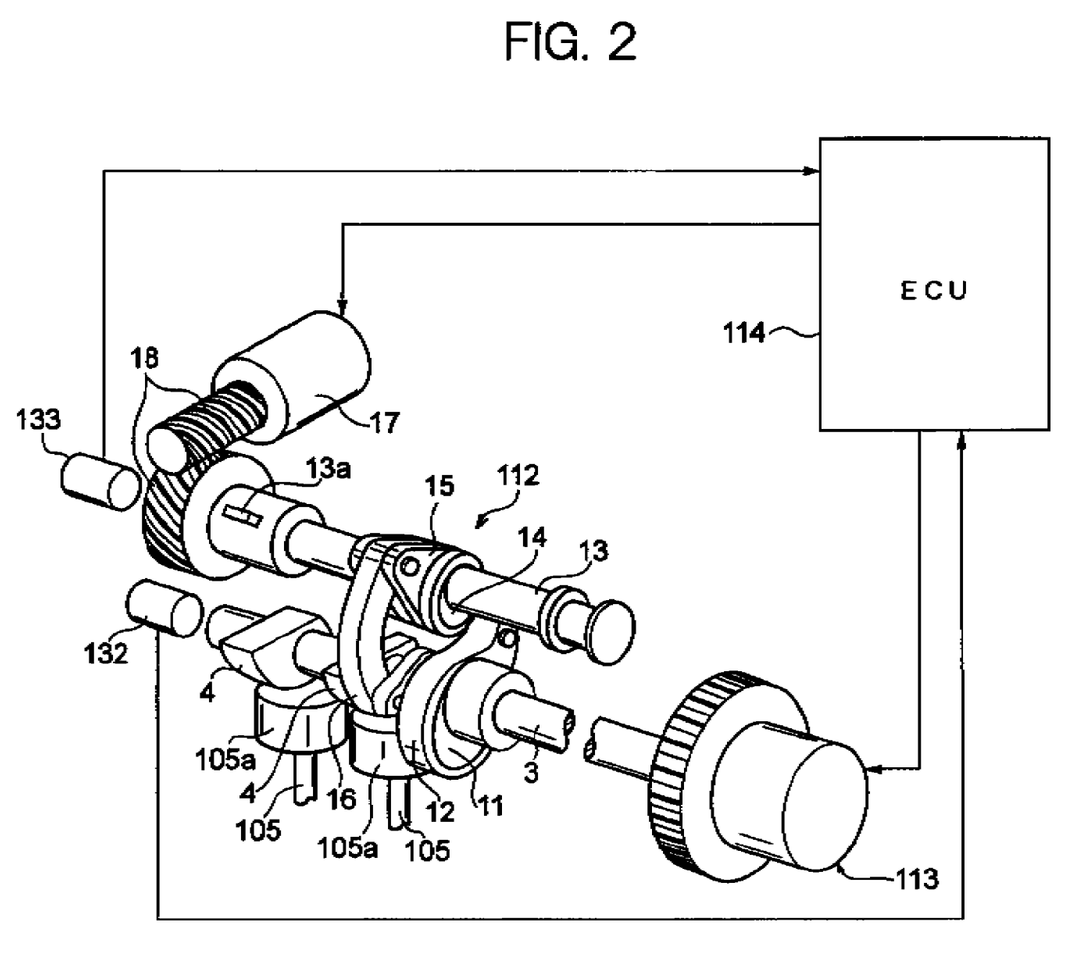
FIG. 2 is a perspective view illustrating a variable lift mechanism according to an embodiment of the present invention.

FIG. 2 is a perspective view showing the structure of variable lift mechanism 112.

Referring to FIG. 2, engine 101 includes a pair of intake valves 105 for each cylinder. At a position above intake valves 105, intake camshaft 3 rotationally driven by crankshaft 120 is supported rotatably along the direction of the cylinder arrangement.

On intake camshaft 3, swing cams 4 which is arranged to be in contact with valve lifters 105a of intake valves 105 to thereby open/close intake valves 105 are relatively rotatably fitted from outside.

Between intake camshaft 3 and swing cams 4, variable lift mechanism 112 for continuously changing the valve operation angle and the valve lift amount of intake valves 105 is arranged.

Also, variable valve timing mechanism 113 for continuously changing the center phase of the operation angle of intake valves 105 by changing the rotation phase of intake camshaft 3 with respect to crankshaft 120, is arranged at an end of intake camshaft 3.

Figure 3:
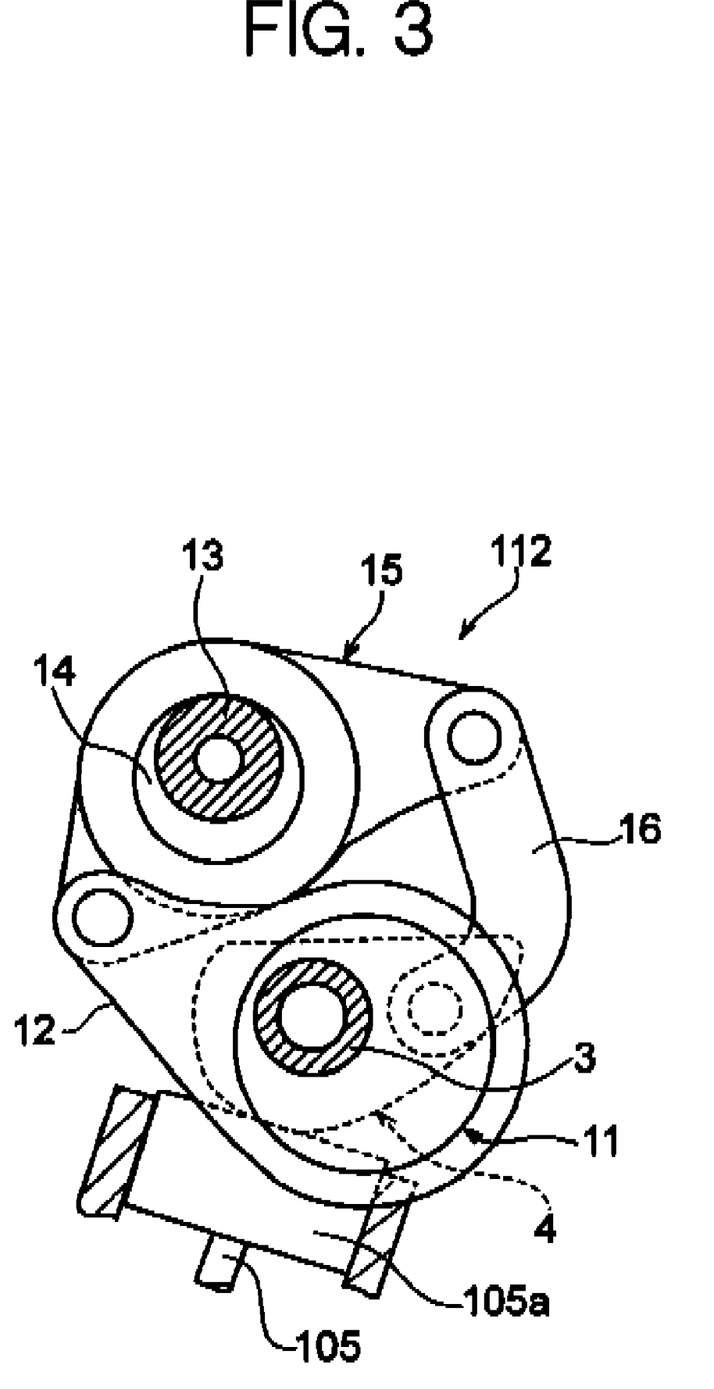
FIG. 3 is a cross-sectional view illustrating a variable lift mechanism according to an embodiment of the present invention.

Variable lift mechanism 112, as shown in FIGS. 2 and 3, includes a circular drive cam 11 which is fixed eccentrically on intake camshaft 3, an annular link 12 which is relatively rotatably fitted from outside on drive cam 11, a control shaft 13 extending along the direction of the cylinder arrangement substantially in parallel to intake camshaft 3, a circular control cam 14 eccentrically fixed on control shaft 13, a rocker arm 15 relatively rotatably fitted on the outside of control cam 14 and having an end coupled to the forward end of annular link 12, and a rod-like link 16 coupled to the other end of rocker arm 15 and swing cam 4.

In control shaft 13, which is rotationally driven through a gear train 18 by a motor (actuator) 17, a movable-side stopper 13a formed integrally with and protruded from the outer periphery of control shaft 13 comes into contact with a fixed-side stopper (not shown) arranged on the cylinder head to thereby prevent the further rotation in the direction to reduce the lift amount at an angular position corresponding to a preset minimum lift position.

A stopper mechanism including the movable-side stopper and the fixed-side stopper may be arranged at a position limiting the minimum lift and a position limiting the maximum lift.

In this configuration, with the rotation of intake camshaft 3 in operatively interlocked relation with crankshaft 120, an annular link 12 is moved substantially in parallel through drive cam 11. At the same time, rocker arm 15 is swung around the axis of control cam 14, and swing cams 4 are swung through rod-like link 16 to thereby open/close intake valves 105.

Also, by changing the rotation position of control shaft 13 (mechanical load) by controlling motor 17 (actuator), the axial position of control cam 14 constituting the swinging center of rocker arm 15 is changed to thereby change the position of swing cams 4.

As a result, while the center phase of the operation angle of intake valves 105 remains substantially constant, the operation angle and the lift amount of intake valves 105 are continuously changed.

Incidentally, variable lift mechanism 112 in which the center phase of the valve operation angle changes with the change in the operation angle and the lift amount of intake valves 105, may be used.

Control unit 114 receives an output signal of angle sensor 133 for detecting the rotation angle of control shaft 13. In order to rotate control shaft 13 to a target rotation position corresponding to a target lift amount, the direction and magnitude of the current of motor 17 are controlled by feedback based on the difference between the rotation position calculated from the output signal of angle sensor 133 and the target angular position.

Angle sensor 133 is a no-contact type angle sensor. Specifically, as disclosed in Japanese Laid-open (Kokai) Patent Application Publication No. 2003-194580, for example, it includes a magnet mounted at an end of control shaft 13 and a magneto-electric conversion means arranged in opposed relation to the outer peripheral surface of the magnet, and detects the change in magnetic fluxes with the rotation of control shaft 13.

Nevertheless, angle sensor 133 is not limited to no-contact type, and may be a contact-type angle sensor using a potentiometer, for example.

In the case where the mounting position of angle sensor 133 is left to be in misalignment at the time of replacement of angle sensor 133 in a maintenance factory, for example, angle sensor 133 may produce an output exceeding the tolerable input range of an input circuit for receiving an output signal of angle sensor 133 arranged in control unit 114.

With the output of angle sensor 133 exceeding the tolerable input range of the input circuit, the detection accuracy of the rotation position of control shaft 13 cannot be maintained, while at the same time posing a problem that judgment of malfunction of angle sensor 133 may be mistaken.

In order to compensate for the misalignment of the mounting position of angle sensor 133, therefore, the adjusting operation described below is carried out.

First, in the case where the adjusting operation is conducted when angle sensor 133 is replaced, a terminal device 151 as an adjusting device is connected to control unit 114 via a communication cable 152.

Terminal device 151 is a small portable device and has a liquid crystal screen, a keyboard, etc.

The worker of the maintenance factory, by operating the keyboard of terminal device 151, can cause control unit 114 to output an adjustment request signal.

The adjustment request signal is a command to move control shaft 13 (mechanical load) forcibly to a position associated with the minimum valve lift amount to carry out the operation of adjusting the mounting position of angle sensor 133.

Control unit 114 and terminal device 151 may be configured to communicate with each other by radio communication.

Figure 4:
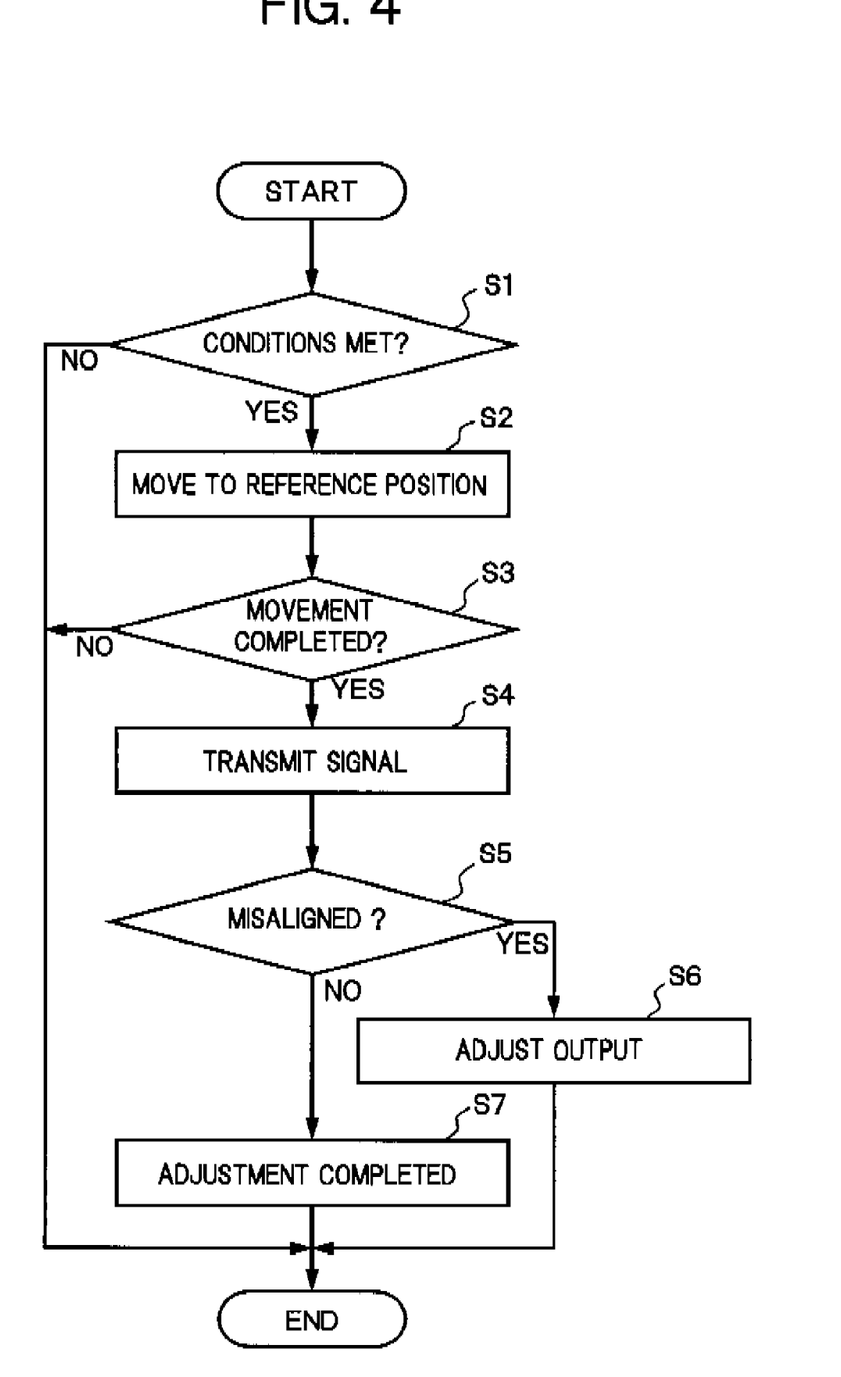
FIG. 4 is a flowchart illustrating a sensor adjusting method according to a first embodiment of the present invention.

A specific adjusting operation is carried out along the flow shown in the flowchart of FIG. 4.

First, control unit 114 judges whether or not the conditions are met to move control shaft 13 to the position of the minimum lift to adjust the output of angle sensor 133 (step S1).

Specifically, control unit 114 judges that the control conditions are met in the case where an adjustment request signal is received from terminal device 151 and engine 101 is stopped and/or vehicle 100 is stationary.

The condition that engine 101 is stopped and/or vehicle 100 is stationary is such a condition that the operation is not adversely affected even if the lift amount of intake valves 105 is minimized.

Control unit 114, upon judging that the control conditions are met, controls motor 17 and rotates control shaft 13 in the direction to reduce the valve lift amount, and forcibly rotate it to the minimum lift position (reference position) where the rotation of control shaft 133 is restricted by a stopper (step S2).

The drive control to reduce the valve lift amount can be achieved by gradually changing the target rotation position in such a direction as to reduce the valve lift amount by feedback control based on the error between the target rotation position and the actual rotation position of control shaft 13 detected by angle sensor 133.

The valve lift amount can be forcibly reduced also by feedforward control to gradually increase the operation amount (current or voltage value) of motor 17 for rotating control shaft 13 in such a direction to reduce the valve lift amount.

Further, control unit 114 judges whether control shaft 13 is completely moved or not to the minimum lift position (reference position) (step S3).

Whether control shaft 13 has completely moved to the minimum lift position (reference position) or not is judged based on whether the operation amount (current or voltage value) of motor 17 has reached a specified value or not.

For example, in the case where the target rotation position for feedback control is gradually changed in such a direction as to reduce the valve lift amount, when the target rotation position changes even after control shaft 13 strikes the stopper and fails to rotate further, control shaft 13 tries to rotate further. Accordingly, the operation amount of motor 17 undergoes a great change. Thus, the arrival at the minimum lift position (reference position) can be determined from the change in operation amount.

In the case of the feedforward control by gradually changing the operation amount (current or voltage value) of motor 17, on the other hand, the fact that control shaft 13 strikes the stopper can be estimated at a time point when the operation amount of motor 17 increases to a certain level.

Figure 5:
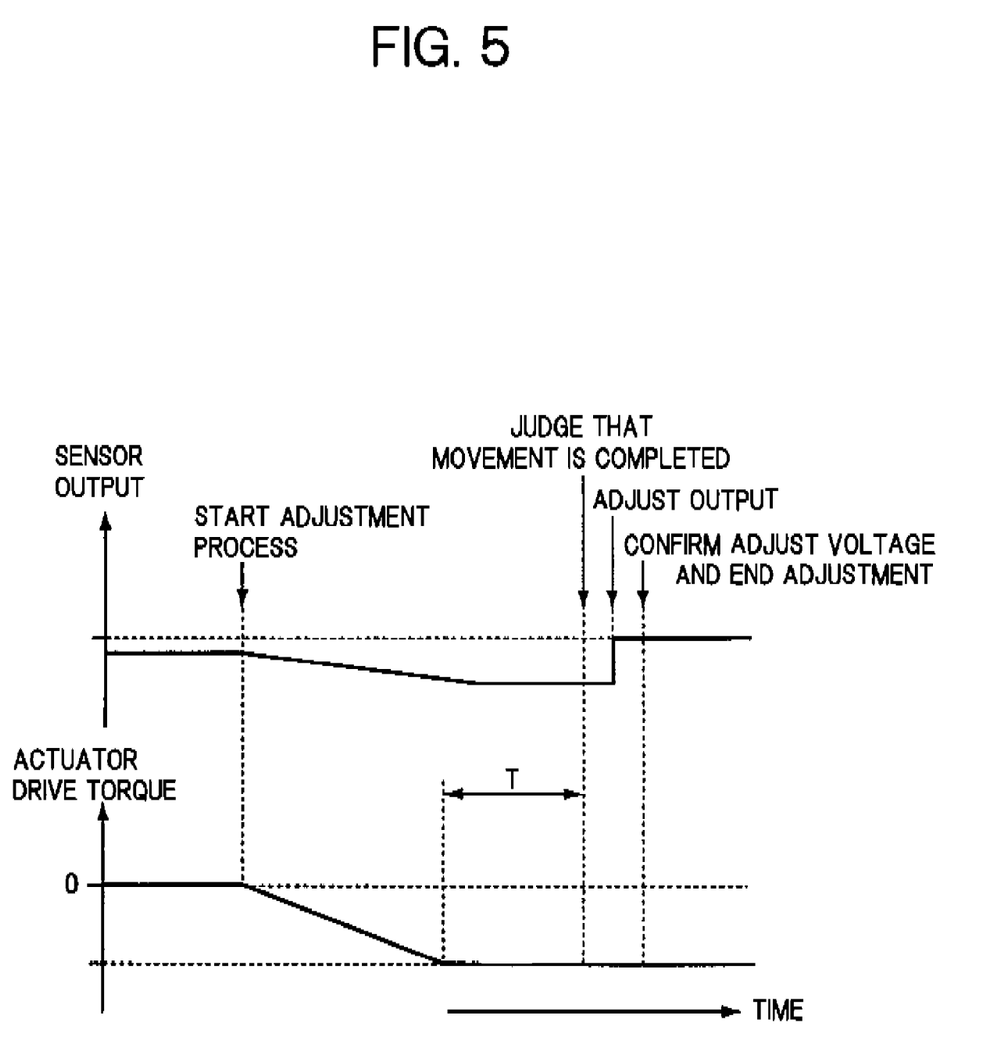
FIG. 5 is a timing chart illustrating the correlation between the sensor output and the actuator torque in the adjusting method according to the first embodiment.

Also, the operation amount of motor 17 is held at a specified value after reaching the particular specified value and upon lapse of the holding time not shorter than T, the complete movement of control shaft 13 to the minimum lift position is determined. Then, a more accurate judgment is made possible taking the operation delay of control shaft 13 into account (see FIG. 5).

Further, when the sensor output stably indicates a constant value even in the case where the angle detection performed by angle sensor 133 is low in accuracy, it can be judged that control shaft 13 is in the stationary state, i.e., the stopper is struck.

Therefore, in the case where the operation amount of motor 17 reaches a specified value and the output of angle sensor 133 is stable and not variable, it can be judged that the movement of control shaft 13 to the minimum lift position thereof is completed. Also, in the case where a specified time T or longer has elapsed from the arrival of the operation amount of motor 17 at a specified value and the output of angle sensor 133 is stable and not variable, it can be judged that the movement of control shaft 13 to the minimum lift position is completed.

Control unit 114, upon judging that control shaft 13 is completely moved to the minimum lift position, outputs a signal (movement completion signal) indicating that control shaft 13 has moved completely to the minimum lift position (reference position) to terminal device 151 together with the signal of angle sensor 133 in order to adjust the mounting position of the sensor under this condition.

Terminal device 151 that has received the movement completion signal displays, on the screen thereof, that the movement of control shaft 13 to the minimum lift position is complete, i.e., a message notifying the worker that the adjustment is possible. At the same time, the output value (output voltage) of angle sensor 133 sent from control unit 114 is displayed (step S4).

Further, terminal device 151 desirably has the function of storing and displaying a reference output value of angle sensor 133 at the minimum lift position.

The worker who has confirmed on the screen of terminal device 151 that control shaft 13 is at the minimum lift position compares the prevailing sensor output with the reference output value, and thus judges whether the mounting position of angle sensor 133 is misaligned or not (step S5).

If misaligned, the mounting position of angle sensor 133 is adjusted manually so that the sensor output comes within a predetermined range (tolerable range) which contains the reference output value (step S6).

As long as the sensor output is different from the reference output value, adjustment of the mounting position is repeated, and at the time point when the sensor output and the reference output value substantially coincide with each other, the operation of adjusting the mounting position is finished (step S7).

When the mounting-position adjusting operation is completed, the target rotation position of control shaft 13 is returned to the normal value and motor 17 is switched off so that the control operation state of control shaft 13, which state is used in adjustment, is restored to normal state. With the aforementioned configuration, when the control shaft (mechanical load) of variable lift mechanism 112 (variable valve mechanism) is at a reference position defined by the stopper, the adjusting operation is conducted such that the sensor output at that time is set at the reference output value. Therefore, the accurate adjusting operation is made possible.

Also, since control shaft 13 is forcibly moved by motor 17 (actuator) to the reference position defined by the stopper, it becomes possible to perform adjustment with a condition where control shaft 13 is located at the reference position even in the case where variable lift mechanism 112 is not equipped with a return spring for forcibly restoring the stopper position.

Figure 6:
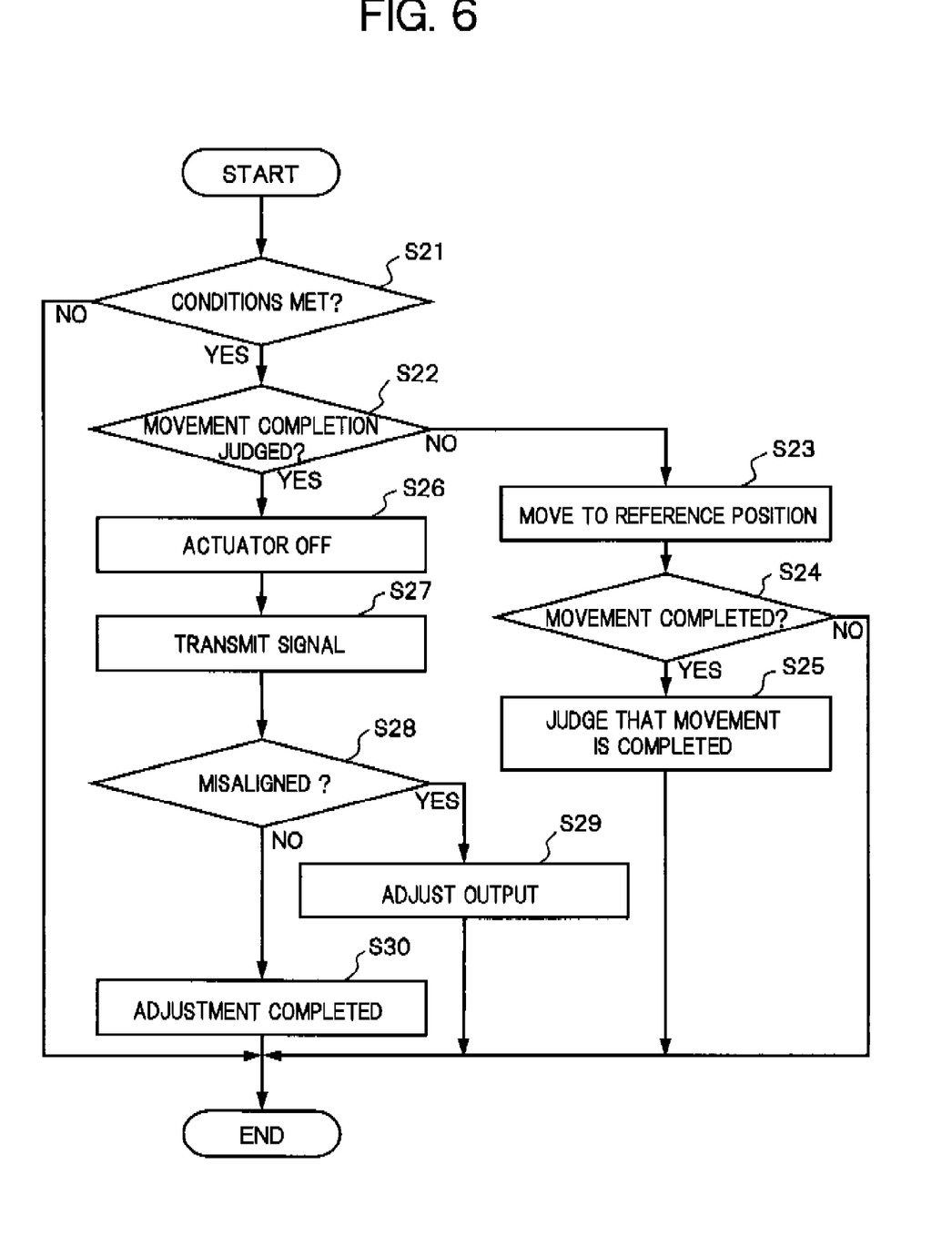
FIG. 6 is a flowchart illustrating a sensor adjusting method according to a second embodiment of the present invention.

The flowchart of FIG. 6 shows another example of the adjusting operation.

In starting the adjusting operation, as described above, the first step is to connect terminal device 151 to control unit 114 and transmit an adjustment request signal from terminal device 151 to control unit 114.

Control unit 114 judges that the control conditions for moving control shaft 13 to the minimum lift position are met to adjust the output of angle sensor 133, when the adjustment request signal is received from terminal device 151 and engine 101 is stopped and/or vehicle 100 is stationary (step S21).

In the case where the control conditions are met, it is judged whether it is determined or not that the movement of control shaft 13 to the minimum lift position (reference position) has been completed (step S22).

In the case where the movement completion is not determined, motor 17 is controlled so that control shaft 13 is rotated in the direction to reduce the lift amount and thus forcibly moved to the minimum lift position where the rotation of control shaft 13 is restricted by the stopper (step S23).

The aforementioned movement control is carried out in a manner similar to step S2.

Then, control unit 114 judges whether the movement of control shaft 13 to the minimum lift position (reference position) is completed or not (step S24).

This judgment is made in a manner similar to step S3.

When it is judged that the movement of control shaft 13 to the minimum lift position (reference position) is completed, determination of movement completion is performed (step S25), followed by the subsequent process proceeding from step S22 to S26.

When it is determined that the movement of control shaft 13 is completed, motor 17 is switched off to reduce the motor torque to zero (step S26).

By switching off motor 17, the stopper can be prevented from being displaced by the motor torque and the sensor output from being adjusted on the erroneous assumption that the position displaced from the original stopper position is a reference position.

When switching off motor 17, the motor torque is not reduced to zero stepwise but gradually. Consequently, control shaft 13 can be prevented from being displaced from the minimum lift position by abrupt restoration of the displacement (see FIG. 7).

Figure 7:
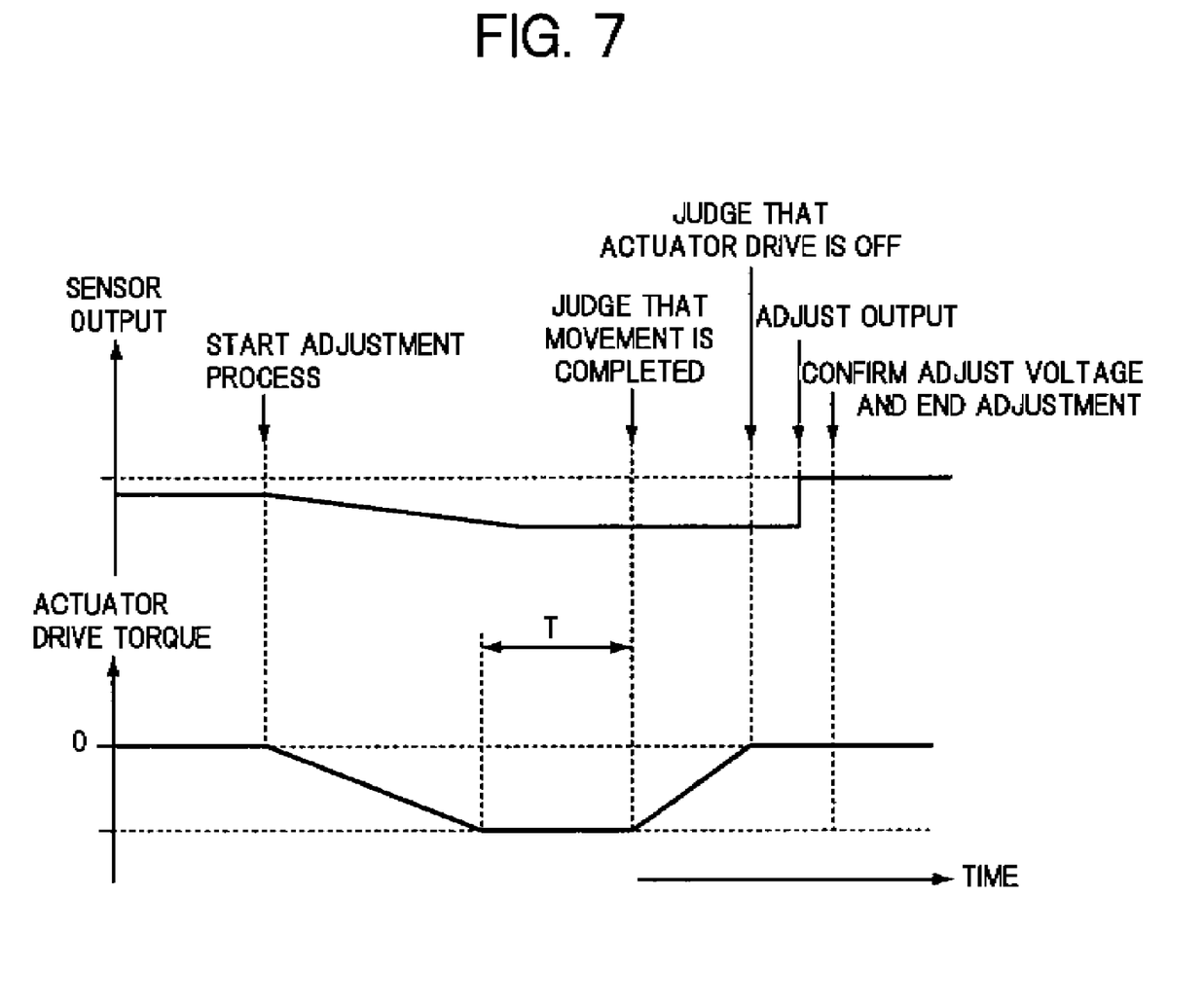
FIG. 7 is a timing chart illustrating the correlation between the sensor output and the actuator torque in the adjusting method according to the second embodiment.

Further, at the time point when the motor torque is gradually reduced to the specified torque, the torque is held, and under a predetermined torque, the sensor output can be adjusted.

If control shaft 13 is pressed against the stopper with an appropriate torque, control shaft 13 can be stably held at the reference position (minimum lift position), and prevented from being displaced from the reference position (minimum lift position) inadvertently during the adjusting operation.

By executing the process of reducing the motor torque to zero or lessening it, a signal (movement completion signal) indicating that the movement of control shaft 13 to the minimum lift position (reference position) is completed is output to terminal device 151 together with the signal of angle sensor 133 (step S27).

Terminal device 151 that has received the movement completion signal displays, on the screen thereof, a message announcing to the worker that control shaft 13 has completely moved to the minimum lift position, while at the same time displaying the output value of angle sensor 133 sent from control unit 114 (step S27).

The worker that has confirmed on the screen of terminal device 151 that control shaft 13 is at the minimum lift position compares the sensor output at that time with the reference output value to thereby judge whether the mounting position of angle sensor 133 is misaligned or not (step S28). In the case where it is misaligned, the worker manually adjusts the mounting position of angle sensor 133 so that the sensor output may coincide with the reference output value (step S29).

As long as the sensor output and the reference output value are different from each other, the adjustment of the mounting position is repeated, and at the time point when the sensor output and the reference output value substantially come into coincidence with each other, the adjusting operation is finished (step S30).

When the adjusting operation is completed, the target rotation position of control shaft 13 is returned to the normal value and motor 17 is switched off so that the control operation of control shaft 13, which state is used in adjustment, is restored to normal state.

Since the adjusting operation described above is carried out in such a manner that the sensor output is set to be the reference output value when control shaft 13 is located at the reference position mechanically determined by the stopper, it is possible to perform the accurate adjustment.

Also, since control shaft 13 is forcibly moved by motor 17 to the reference position mechanically determined by the stopper, the adjustment is possible with control shaft 13 located at the reference position even in the case where a mechanism is not equipped with a return spring to forcibly return control shaft 13 to the stopper positions such as variable lift mechanism 112.

Further, since control shaft 13 is accurately moved to the minimum lift position limited by the stopper while the motor torque is relaxed at the same time before starting the adjusting operation, the adjustment accuracy is prevented from being reduced by the stopper displacement caused by the motor torque.

The aforementioned adjusting operation is carried out in such a manner that the sensor output at the minimum lift position is adjusted by adjusting the mounting position of angle sensor 133 if the sensor output at the minimum lift position is different from the reference output value. As an alternative, by adjusting the characteristic value of an output adjusting device built in angle sensor 133, the sensor output can be set to the reference output value. Further, after rough adjustment by adjusting the mounting position, fine adjustment can be made by adjusting the characteristic value (electrical characteristics) of the output adjusting device.

The aforementioned adjustment of the characteristic values of the output adjusting device includes the volume adjustment, for example, to change the output level (the resistance value of the output circuit) of angle sensor 133.

Also, the mounting position and/or the electrical characteristics may be adjusted not manually by the worker but automatically using an automatic adjusting device to adjust the mounting position and the electrical characteristics automatically.

Also, while the adjustment request signal can be output directly to control unit 114 from the automatic adjusting device, data can be transmitted/received between control unit 114 and the automatic adjusting device through terminal device 151.

Further, terminal device 151 is used not only for adjusting the sensor output but also may have the function of displaying a failure diagnosis history read from control unit 114 or resetting the failure diagnosis history of control unit 114.

Also, in the case where the maximum lift position is limited by the stopper mechanism in variable lift mechanism 112, the sensor output can be adjusted after moving control shaft 13 to the maximum lift position with the maximum lift position as a reference position.

Also, the variable valve mechanism is not limited to variable lift mechanism 112, but this invention is apparently applicable also to variable valve mechanisms having other structures.

Further, the maximum or minimum value of the adjustment range of the open characteristic of the variable valve mechanism is not necessarily required to be set as a reference position. Alternatively, in the presence of a lock mechanism for fixing the mechanical load at an intermediate position thereof, for example, the particular intermediate position fixed by the lock mechanism can be set as a reference position. Also, in a variable valve mechanism such as an electromagnetic drive valve with the intermediate lift position as a default position, for example, the default position can be set as a reference position.

Also, the mechanical load driven by the actuator in the variable valve mechanism is not limited to the one rotationally driven by an actuator but may be the one moved linearly by the actuator.

The entire contents of Japanese Patent Application No. 2007-033720, filed Feb. 14, 2007 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

I claim:

1. A method of adjusting a sensor for detecting a position of a mechanical load driven by an actuator arranged in a variable valve mechanism that is capable of variably changing an open characteristic of an engine valve in accordance with the position of the mechanical load, comprising the steps of:
   moving the mechanical load to a reference position by the actuator;
   judging whether or not the mechanical load has moved to the reference position;
   judging whether or not an output of the sensor is within a reference range after the mechanical load has moved to the reference position; and
   adjusting the output of the sensor in such a manner that the output of the sensor comes within the reference range, based on the judging step of the sensor output.

2. The sensor adjusting method according to claim 1, wherein the step of adjusting the output of the sensor comprises the step of adjusting the output of the sensor by performing adjustment of a mounting position of the sensor.

3. The sensor adjusting method according to claim 1, wherein the step of adjusting the output of the sensor comprises the step of adjusting the output of the sensor by adjusting electrical characteristics of the output of the sensor.

4. The sensor adjusting method according to claim 1, wherein the step of moving the mechanical load to the reference position by the actuator comprises the step of moving the mechanical load to the reference position during a stop state of the engine.

5. The sensor adjusting method according to claim 1, wherein the step of moving the mechanical load to the reference position by the actuator comprises the step of moving the mechanical load to the reference position while a vehicle is being stopped.

6. The sensor adjusting method according to claim 1, wherein the step of moving the mechanical load to the reference position by the actuator comprises the steps of:
   receiving an adjustment request signal from an external source: and
   driving the mechanical load to start a movement thereof to the reference position when the adjustment request signal is received.

7. The sensor adjusting method according to claim 1, wherein
   the variable valve mechanism includes a control shaft configured to behave as the mechanical load and to be rotated by the actuator to thereby change a lift amount of the engine valve, and
   the sensor detects a rotation angle of the control shaft.

8. The sensor adjusting method according to claim 1, wherein the variable valve mechanism includes a stopper mechanism which limits a change in the position of the mechanical load, and
   the reference position is set to take a position where the change in the position of the mechanical load is limited by the stopper mechanism.

9. The sensor adjusting method according to claim 8, wherein the step of judging whether or not the mechanical load has moved to the reference position comprises the steps of:
   judging whether or not an operation amount of the actuator has reached a specified value; and
   determining that the mechanical load has moved to the reference position under at least a condition that the operation amount of the actuator has reached the specified value.

10. The sensor adjusting method according to claim 8, wherein the step of judging whether or not the mechanical load has moved to the reference position comprises the steps of:
    judging whether or not an operation amount of the actuator has reached a specified value;
    measuring a time that has elapsed after the operation amount of the actuator reaches the specified value; and
    determining that the mechanical load has moved to the reference position when the elapsed time reaches a predetermined time.

11. The sensor adjusting method according to claim 8, wherein the step of judging whether or not the mechanical load has moved to the reference position comprises the steps of:

judging whether or not an operation amount of the actuator has reached a specified value;

judging whether or not the output of the sensor is maintained at a constant; and determining that the mechanical load has moved to the reference position when the operation amount of the actuator has reached the reference position and the output of the sensor is kept constant.

12. The sensor adjusting method according to claim 8, wherein the step of judging whether or not the mechanical load has moved to the reference position comprises the steps of:

judging whether or not an operation amount of the actuator has reached a specified value;

measuring a time elapsed after the operation amount of the actuator reaches the specified value; and judging whether or not the output of the sensor is maintained at a constant; and judging that the mechanical load has moved to the reference position when the elapsed time reaches a predetermined time and the output of the sensor is kept constant.

13. The sensor adjusting method according to claim 8, wherein the variable valve mechanism variably changes a lift amount of the engine valve, the driving of the actuator is limited by the stopper mechanism to at least a minimum lift position, and the minimum lift position constitutes the reference position.

14. The sensor adjusting method according to claim 8, further comprising the step of:

stopping the drive of the mechanical load by the actuator when it is judged that the mechanical load has moved to the reference position limited by the stopper mechanism.

15. The sensor adjusting method according to claim 14, wherein the step of stopping the drive of the mechanical load by the actuator comprises the step of gradually reducing a drive torque of the actuator until the drive of the mechanical load by the actuator is stopped.

16. The sensor adjusting method according to claim 8, further comprising the step of:

lessening the drive torque of the actuator when it is judged that the mechanical load has moved to the reference position limited by the stopper mechanism.

17. The sensor adjusting method according to claim 16, wherein the step of lessening the drive torque of the actuator comprises the step of gradually reducing the drive torque exerted by the actuator.

18. An adjusting system for a sensor for detecting a position of a mechanical load driven by an actuator in a variable valve mechanism that is capable of variably changing an open characteristic of an engine valve, in accordance with the position of the mechanical load, comprising:

an adjusting unit configured to output an adjustment request signal requesting to move the mechanical load to a reference position; and a control unit that is configured:

to receive an output signal of the sensor and the adjustment request signal from the adjusting unit, to drive the actuator, to judge whether or not the mechanical load has moved to the reference position, and to output a result of the judgment to the adjusting unit together with the output signal of the sensor.

19. The sensor adjusting system according to claim 18, wherein the adjusting unit stores in advance a reference output signal of the sensor at the reference position.

20. The sensor adjusting system according to claim 18, wherein the adjusting unit is arranged to automatically adjust the output of the sensor into a reference range after the mechanical load has moved to the reference position.

* * * * *